United States Patent
Hiwatashi et al.

(10) Patent No.: US 6,370,474 B1
(45) Date of Patent: Apr. 9, 2002

(54) VEHICULAR ACTIVE DRIVE ASSIST SYSTEM

(75) Inventors: Yutaka Hiwatashi; Keiji Hanawa, both of Mitaka (JP)

(73) Assignee: Fuji Jukogyo Kabushiki Kaisha, Tokyo-To (JP)

(*) Notice: Subject to any disclaimer, the term of this patent is extended or adjusted under 35 U.S.C. 154(b) by 0 days.

(21) Appl. No.: 09/665,103

(22) Filed: Sep. 20, 2000

(30) Foreign Application Priority Data

Sep. 22, 1999 (JP) .......................................... 11-269548

(51) Int. Cl.$^7$ ................................................. G08G 1/16
(52) U.S. Cl. ...................... 701/300; 701/301; 340/436; 348/142; 348/148
(58) Field of Search .......................... 701/96, 300, 301; 342/455; 340/435, 436, 901, 903; 348/142, 148, 149, 118

(56) References Cited

U.S. PATENT DOCUMENTS

| | | | | |
|---|---|---|---|---|
| 5,483,453 A | * | 1/1996 | Uemura et al. ............. | 701/300 |
| 5,517,412 A | * | 5/1996 | Unoura ....................... | 348/118 |
| 5,555,312 A | * | 9/1996 | Shima et al. ............... | 701/301 |
| 5,621,645 A | * | 4/1997 | Brady ......................... | 701/301 |
| 5,790,403 A | * | 8/1998 | Nakayama .................. | 701/301 |
| 5,926,126 A | * | 7/1999 | Engelman ................... | 701/300 |
| 6,185,492 B1 | * | 2/2001 | Kagawa et al. ............. | 348/118 |

* cited by examiner

*Primary Examiner*—Gary Chin
(74) *Attorney, Agent, or Firm*—Smith, Gambrell & Russell, LLP (57) ABSTRACT

A vehicular active drive assist system including a lane deviation judgment unit which judges the possibility of deviation of own vehicle from a traffic lane on a roadway ahead and a warning control unit which controls a warning based on judgment results fed from the lane deviation judgment unit, wherein the lane deviation judgment unit sets a first judgment line approximately parallel to a lateral direction of the own vehicle at a first distance ahead of the own vehicle, sets a second judgment line approximately parallel to the lateral direction of the own vehicle at a second distance ahead of the own vehicle, makes a judgment on the possibility of deviation from the traffic lane based on the location of the own vehicle and the location of lane markings on the first judgment line, makes another judgment on the possibility of deviation from the traffic lane based on the location of the own vehicle and the location of the lane markings on the second judgment line, and finally judges the possibility of deviation from the traffic lane based on the results of these two judgments.

4 Claims, 5 Drawing Sheets

| VEHICLE SPEED | LEFT SIDE JUDGMENT VALUE $D_{HL}$ | RIGHT SIDE JUDGMENT VALUE $D_{HR}$ |
|---|---|---|
| 80km/h OR ABOVE | -0.85m | 0.85m |
| 60km/h OR ABOVE BUT LESS THAN 80km/h | -0.80m | 0.78m |
| LESS THAN 60km/h | -0.75m | 0.70m |

VEHICULAR ACTIVE DRIVE ASSIST SYSTEM

BACKGROUND OF THE INVENTION

1. Filed of the Invention

The present invention relates to a vehicular active drive assist system which makes a proper judgment on the possibility of deviation of own vehicle from a traffic lane and, if there exists the possibility of deviation from the traffic lane, generates a warning to assist a driver in driving.

2. Description of the Related Art

A comprehensive active drive assist system (ADA system) which actively assists a driver in driving operations has been developed in recent years. This ADA system estimates the possibility of various incidences, such as a collision with a vehicle running ahead, contact with an object and deviation from a traffic lane, from information on vehicle driving environments or running state of own vehicle and, when it is predicted that safety can not be maintained, alerts the driver or otherwise performs control operation.

While a laser radar system, for instance, has conventionally been known as a device for obtaining the aforementioned vehicle driving environment information, Japanese Patent Laid-Open No. 265547/1993 covering an application filed by the present applicant proposes an approach to obtaining three-dimensional recognition of a road and traffic environments with practically sufficient accuracy and promptness by processing information on images of scenery and objects ahead of the vehicle captured by a plurality of cameras installed onboard.

Prevention of deviation from a traffic lane, one of functions of the aforementioned ADA system, is intended to alert the driver to an extremely close approach to or crossing of a lane marking by producing a warning, for instance, should such a situation occur, and thereby help prevent traffic accidents which might be caused by a lack of attention, dozing, failure to watch ahead, or other behavior related to the driver's carelessness. Various proposals have already been made with respect to this lane deviation preventing function.

In the aforementioned lane deviation preventing function, one method of judging deviation of own vehicle from a traffic lane, for example, is such that a judgment line parallel to a lateral direction of the own vehicle is set ahead of the own vehicle, the position (lateral position) of the own vehicle and the positions of lane markings on the judgment line are compared, and it is judged that there is a possibility of deviation from the traffic lane if the positions of the lane marker lines does not exist outside the position of the own vehicle. If, however, a roadway has a complicated winding shape forming an S-shaped curve, for instance, there is a possibility of an increased frequency of misjudgments. For example, while there is no possibility of deviation from the traffic lane at a curve immediately ahead if the own vehicle continues to run in its current running state, the judgment line may be set on a curve farther ahead. In this case, a judgment on deviation from the traffic lane would be made on this judgment line, and a misjudgment may be made that there is a possibility of deviation from the traffic lane.

SUMMARY OF THE INVENTION

This invention has been made in consideration of the foregoing circumstances. Accordingly, it is an object of the invention to provide a vehicular active drive assist system which takes into consideration a complicated curve ahead, should it exist, and can make an accurate judgment on the possibility of deviation from a traffic lane.

To achieve the aforementioned object, a vehicular active drive assist system according an embodiment of this invention comprises a lane deviation judgment unit which judges the possibility of deviation of own vehicle from a traffic lane on a roadway ahead and a warning control unit which controls a warning based on judgment results fed from the lane deviation judgment unit, the vehicular active drive assist system being characterized in that the lane deviation judgment unit sets a first judgment line approximately parallel to a lateral direction of the own vehicle at a first distance ahead of the own vehicle, sets a second judgment line approximately parallel to the lateral direction of the own vehicle at a second distance ahead of the own vehicle, makes a judgment on the possibility of deviation from the traffic lane based on the location of the own vehicle and the location of lane markings on the first judgment line, makes another judgment on the possibility of deviation from the traffic lane based on the location of the own vehicle and the location of the markings on the second judgment line, and finally judges the possibility of deviation from the traffic lane based on the results of these two judgments. As a result, it is possible to make an accurate judgment on the possibility of deviation from the traffic lane even when there is a complicated curve ahead.

The vehicular active drive assist system according to the embodiment of this invention further comprises a vehicle speed sensing unit for detecting vehicle speed, wherein the lane deviation judgment unit variably sets positions of the own vehicle on the first judgment line and the second judgment line to be used in judging the possibility of deviation from the traffic lane according to the vehicle speed. Thus, consideration is given to the fact that the seriousness of deviation from the traffic lane varies with the vehicle speed, for instance, and this is reflected in the judgment results so that the system provides higher accuracy and greater practicability.

Further, in the vehicular active drive assist system according to the embodiment of this invention, it is preferred that the lane deviation judgment unit sets a left side judgment value and a right side judgment value differing from each other in size as positions of the own vehicle. This makes it possible to judge the possibility of deviation from the traffic lane in a manner compatible with a driver's recognition of vehicle width.

DESCRIPTION OF THE PREFERRED EMBODIMENTS

An embodiment of the present invention is described below with reference to drawings.

Figure 1:
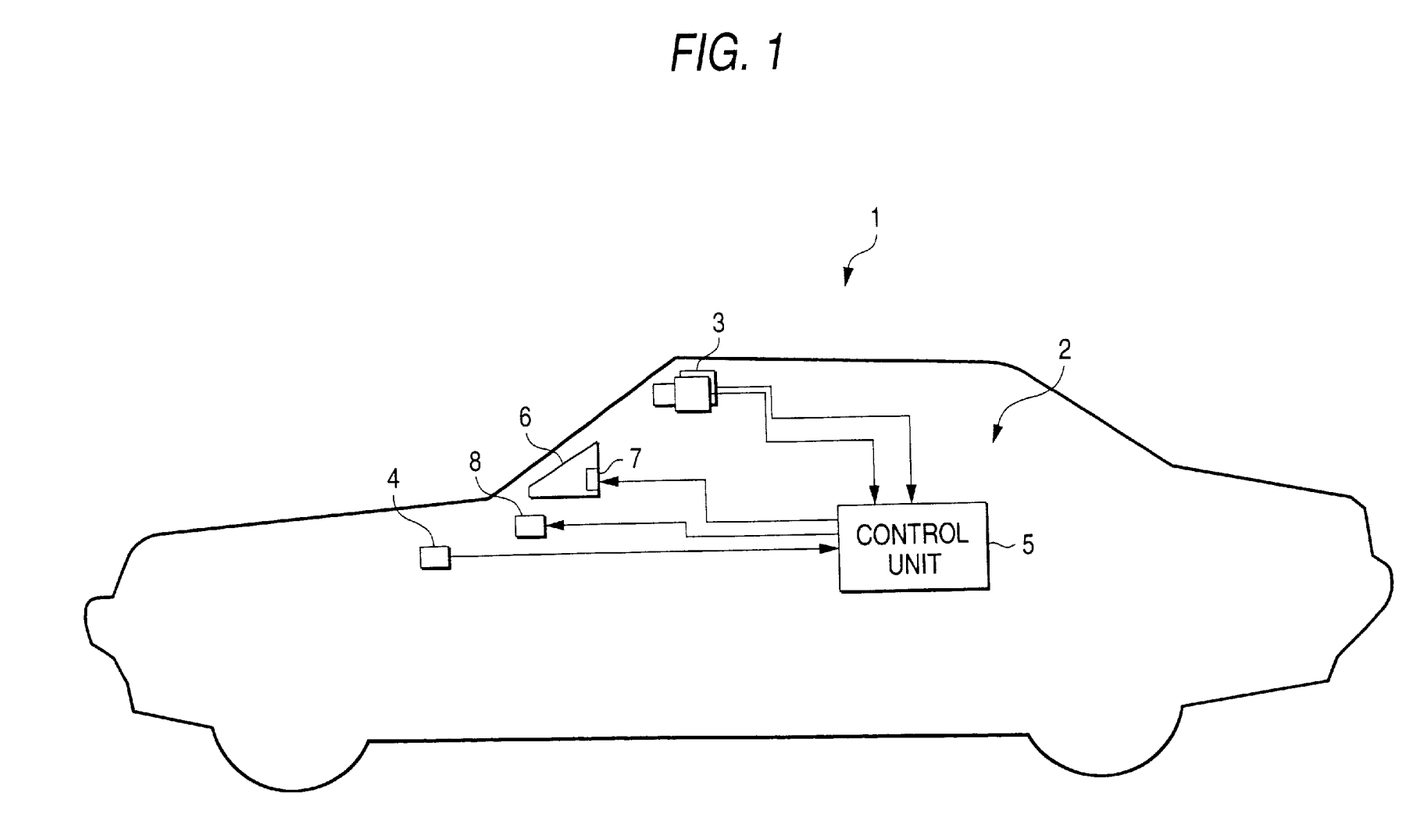
FIG. 1 is a schematic configuration diagram of a vehicular active drive assist system.
Figure 2:
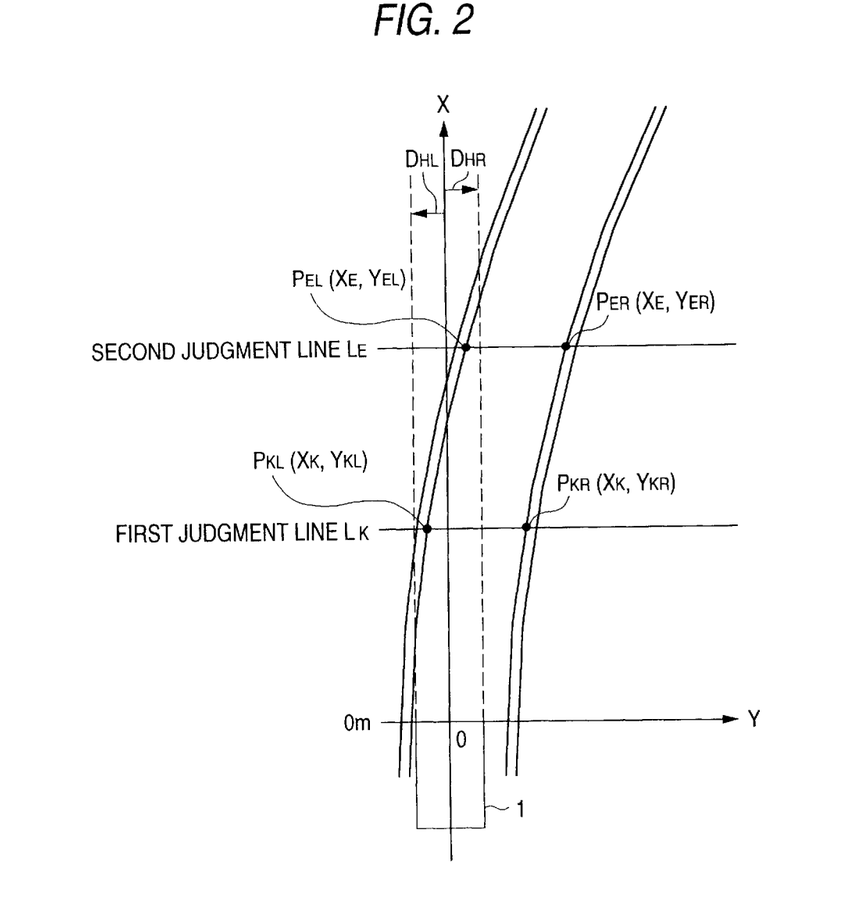
FIG. 2 is an explanatory diagram concerning judgment about deviation from a traffic lane.
Figure 3:
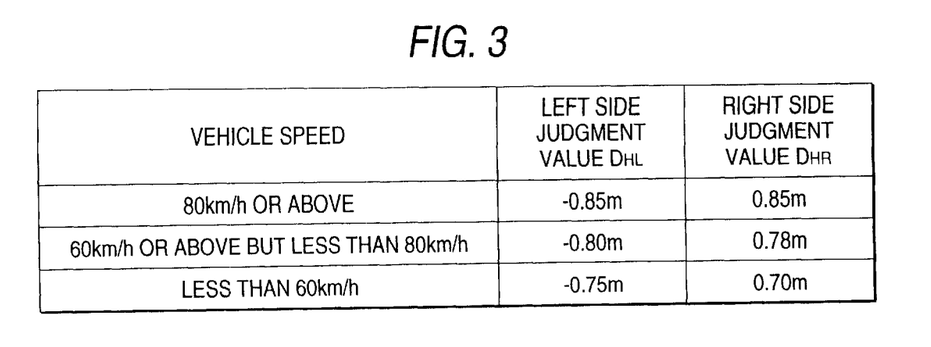
FIG. 3 is an explanatory diagram concerning left and right judgment values which are set according to vehicle speed conditions.
Figure 4:
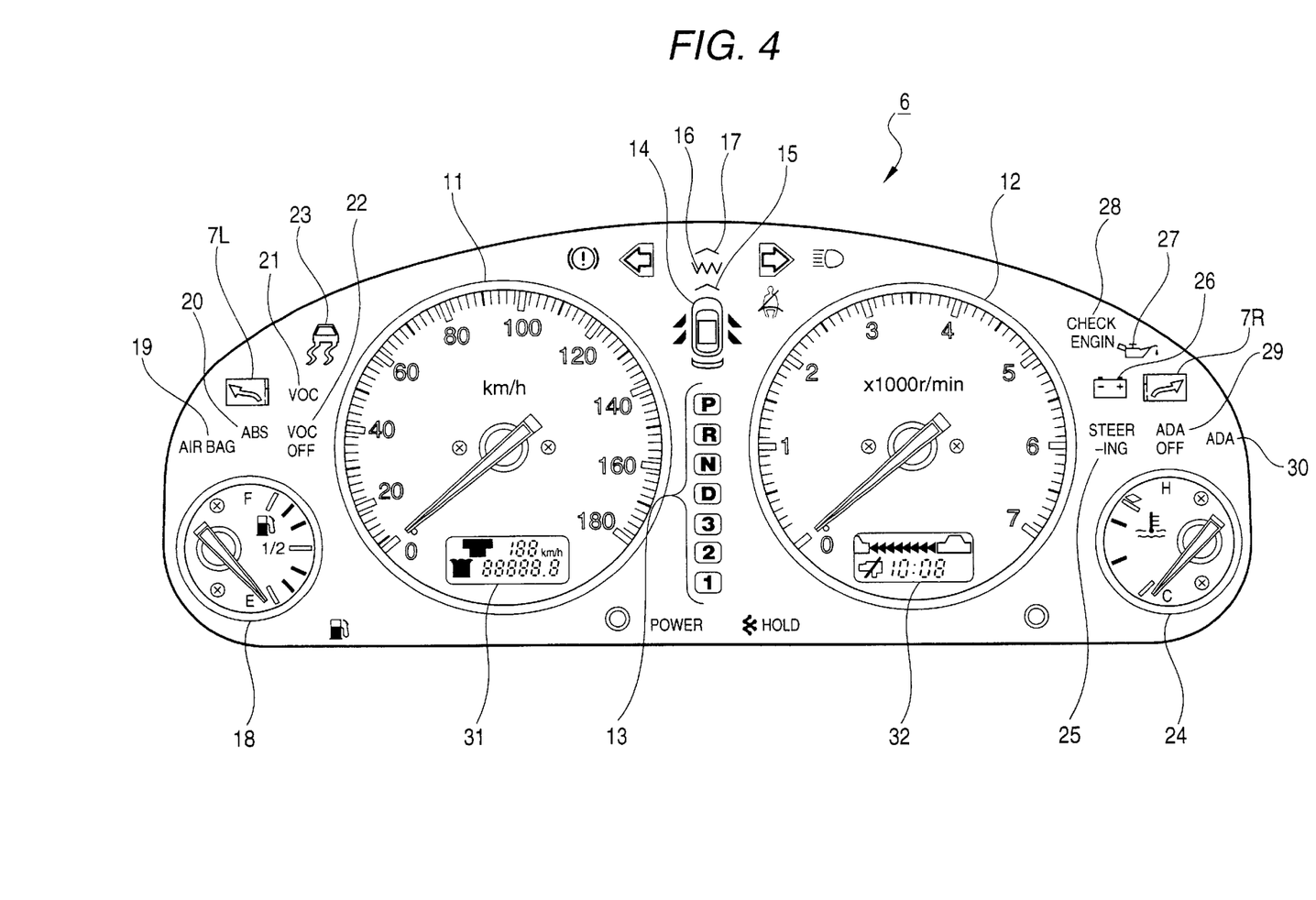
FIG. 4 is an explanatory diagram of a combination meter.
Figure 5:
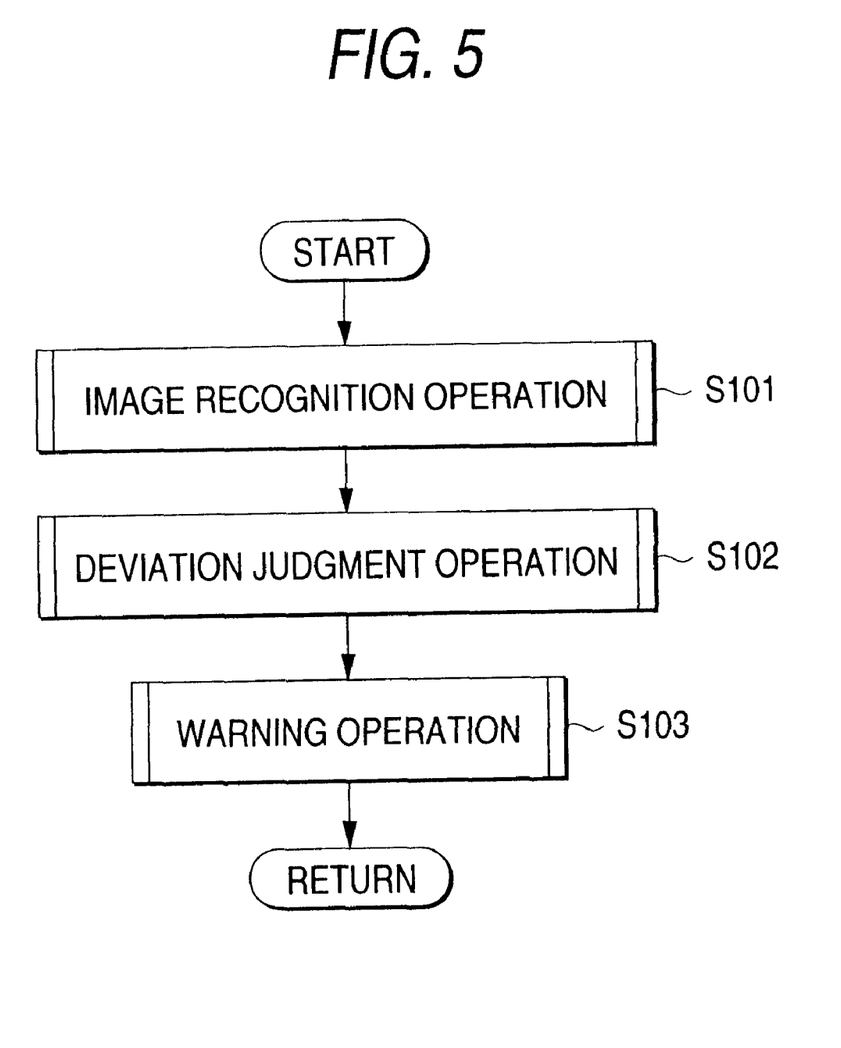
FIG. 5 is a flowchart showing lane deviation preventive control operation.
Figure 6:
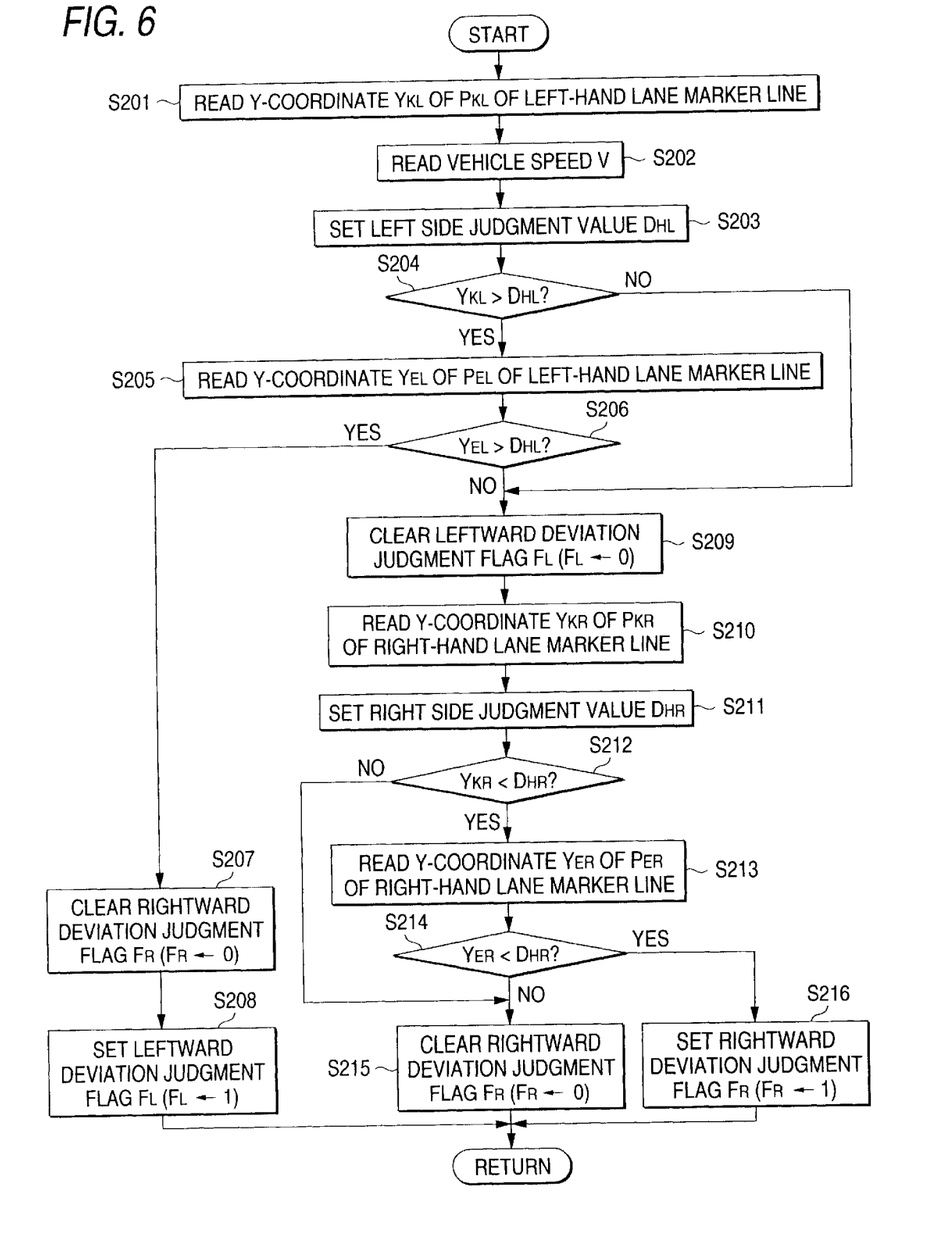
FIG. 6 is a flowchart showing a lane deviation judgment routine.

FIGS. 1 to 6 show the embodiment of the invention, in which FIG. 1 is a schematic configuration diagram of a vehicular active drive assist system; FIG. 2 is an explanatory diagram concerning judgment about deviation from a traffic lane; FIG. 3 is an explanatory diagram concerning left and right side judgment values which are set according to vehicle speed conditions; FIG. 4 is an explanatory diagram of a combination meter; FIG. 5 is a flowchart showing lane deviation preventive control operation; and FIG. 6 is a flowchart showing a lane deviation judgment routine.

Referring to FIG. 1, the reference numeral 1 designates a vehicle (own vehicle) like a motor vehicle. Installed on this own vehicle 1 is a vehicular active drive assist system (ADA system) 2 having as its one function the so-called lane deviation preventing function which alerts a driver to an extremely close approach to or crossing of a lane marking by producing a warning, for instance, should such a situation occur, and thereby help prevent traffic accidents which might be caused by dozing, failure to watch ahead, or other behavior related to the driver's carelessness. The following discussion of the present invention deals only with the lane deviation preventing function of the aforementioned ADA system 2 and a description of its other functions is omitted.

The aforementioned ADA system 2 has a pair of (left and right) CCD cameras 3 using solid-state image pickup devices, such as charge-coupled devices (CCDs). These left and right CCD cameras 3 are installed with a specific distance from each other at a forward part of a ceiling within the vehicle's passenger compartment so that they can take stereoscopic photographs of a subject outside the vehicle from different points of view.

The vehicle 1 is further provided with a vehicle speed sensor 4 serving as vehicle a speed sensing unit which detects vehicle speed V. The ADA system 2 is constructed such that the vehicle speed V detected by the vehicle speed sensor 4 and images in a running direction of the own vehicle 1 photographed by the aforementioned pair of the CCD cameras 3 are entered to a control unit 5.

The images in the running direction of the own vehicle 1 and the vehicle speed V are entered to the aforementioned control unit 5, and the control unit 5 makes a judgment on the possibility of deviation of the own vehicle 1 from a traffic lane on a roadway ahead. If the control unit 5 judges that there is a possibility that the own vehicle 1 may deviate from its current traffic lane, the control unit 5 activates one of warning lamps 7 on a combination meter 6 and a warning buzzer 8 as will be later described.

The aforementioned control unit 5 is made of a multi-microprocessor system having an image processor and has a function as a lane deviation judgment unit, which generates a distance image representative of a three-dimensional distance distribution by performing a processing operation on a pair of stereoscopic images photographed by the aforementioned pair of the CCD cameras 3 to obtain distance information on the entire images from the amount of deviation of each corresponding point on the images using the principle of triangulation, extracts necessary information by processing the distance image, and judges the possibility of deviation of the own vehicle 1 from the roadway ahead.

More specifically, the control unit 5 separates and detects lane marker lines, vehicles and objects other than the vehicles from the aforementioned distance image and thereby obtains image data on road and the objects. Concerning the lane markings, the control unit 5 obtains, from this image data, data concerning coordinates representative of the location and shape of the left and right lane markings ahead of the own vehicle 1 taken on an X-Y coordinate system referenced to the position and moving direction of the own vehicle 1 as shown in FIG. 2 (wherein origin O of the coordinate system is set at the approximate center of the vehicle width approximately at an extreme forward position of its bumper).

With a first judgment line LK set parallel to a lateral direction of the own vehicle 1 at a first distance (e.g., approximately 8.3 m) ahead of the own vehicle 1 and a second judgment line LE set parallel to the lateral direction of the own vehicle at a second distance (e.g., approximately 16.5 m) ahead of the own vehicle 1, a judgment on the possibility of deviation from the traffic lane is made based on the location of the own vehicle and of the lane markings on the first judgment line LK, and another judgment on the possibility of deviation from the traffic lane is made based on the location of the own vehicle and of the lane markings on the second judgment line LE. If results of these two judgments indicate that there is the possibility of deviation from the traffic lane, it is finally judged that there exists the possibility of deviation of the own vehicle 1 from the traffic lane.

The location of the own vehicle on the aforementioned first judgment line LK and second judgment line LE is judged with reference to a left side judgment value DHL and a right side judgment value DHR which will be explained later. If the left-hand lane markings exists closer to and inside the vehicle than the left side judgment value DHL, the own vehicle 1 is judged to be deviating to the left of the traffic lane. Also, if the right-hand lane marking exists closer to and inside the vehicle than the right side judgment value DHR, the own vehicle 1 is judged to be deviating to the right of the traffic lane.

In the example of FIG. 2, the own vehicle 1 is judged to be deviating to the left of the traffic lane because the left-hand lane marking exists closer to and inside the vehicle than the left side judgment value DHL at the location on the first judgment line LK. Also, the own vehicle is judged to be deviating to the left of the traffic lane because the left-hand lane marking exists closer to and inside the vehicle than the left side judgment value DHL at the location on the second judgment line LE. Then, since the own vehicle 1 is judged to be deviating to the left of the traffic lane in the judgment results on both the first judgment line LK and the second judgment line LE, it is finally judged that there exists the possibility of deviation of the own vehicle 1 to the left of the traffic lane.

As shown in FIG. 3, the left side judgment value DHL and the right side judgment value DHR are values preset in an experiment, for instance, based on the actual width (e.g., 1.7 m) of the vehicle and may be variably set according to the vehicle speed V.

Generally, when the speed of a vehicle increases, its deviation from a traffic lane could result in a serious consequence. Accordingly, the higher the vehicle speed, the larger is set the difference between the left side judgment value DHL and the right side judgment value DHR (so that their absolute values would become larger). In the case of a right-hand drive vehicle, a driver can recognize the vehicle width more accurately on the right side than on the left side. Thus, the absolute value of the left side judgment value DHL is therefore set to a larger value than that of the right side judgment value DHR. This difference in the recognition of the vehicle width by the driver almost disappears, however, at high vehicle speeds, so that no difference is set in a high vehicle speed range. Although the same left side judgment values DHL and right side judgment values DHR are used for the first judgment line LK and the second judgment line LE in the present embodiment, different judgment values may be used for the first judgment line LK and the second judgment line LE.

The aforementioned control unit 5 has a function as a warning control unit and generates a warning when there is the possibility of deviation of the own vehicle 1 from the traffic lane based on the aforementioned judgment results concerning the possibility of deviation from the traffic lane. This warning is produced differently according to the vehicle speed, for example. Specifically, generation of the warning is controlled such that it is given by one warning lamp 7 only when the vehicle speed V is between 40 km/h and 50 km/h and by both the warning lamp 7 and the warning buzzer 8 when the vehicle speed V is equal to 50 km/h or above.

The aforementioned ADA system 2 installed on the own vehicle 1 also has such functions as vehicle-to-vehicle distance warning function which helps prevent a collision with a vehicle running ahead and an automatic cruise function which enables safe drive following the vehicle running ahead, besides the aforementioned lane deviation preventing function.

Accordingly, a speedometer 11 and a tachometer 12 are arranged at the left and right on the combination meter 6 of the own vehicle 1 and an AT position indicator 13 for indicating shift select positions is provided between the speedometer 11 and the tachometer 12 as shown in FIG. 4.

There is provided an unclosed door monitor 14 above the AT position indicator 13, and indicators related to the ADA system 2 including an indicator light 15 for indicating cruise set and preceding vehicle lock statuses, a vehicle-to-vehicle distance warning light 16 and a preceding vehicle lock blinker light 17 are arranged in this order above the unclosed door monitor 14.

Further, a fuel meter 18 is provided to the left of the aforementioned speedometer 11, and an air bag warning light 19, an antilock warning light 20, a VDC warning light 21 for a VDC system which controls vehicle behavior by automatic brakes, a VDC OFF indicator 22 and a VDC ON indicator 23 are disposed above the fuel meter 18.

Disposed at an upper-left part of these indicators and warning lights is a leftward lane deviation warning light 7L which constitutes the earlier-mentioned warning lamps 7 and is lit when the own vehicle 1 deviates from the traffic lane to the left side.

Further, a water temperature gauge 24 is provided to the right of the aforementioned tachometer 12, and a steering warning light 25, a charge warning light 26, an oil pressure indicator 27 and a check-engine indicator 28 are provided above the water temperature gauge 24. Also provided together with these indicators and warning lights are an ADA system OFF indicator 29 and an ADA system failure warning light 30 which are related to the ADA system 2.

Disposed at an upper-right part of these indicators and warning lights is a rightward lane deviation warning light 7R which constitutes the earlier-mentioned warning lamps 7 and is lit when the own vehicle 1 deviates from the traffic lane to the right side.

A total mileage/trip odometer 31 using a liquid crystal display for indicating traveled distances obtained by integrating a signal from the vehicle speed sensor is provided in the aforementioned speedometer 11, while a camera recognition/vehicle-to-vehicle distance indicator 32 using a liquid crystal display related to the ADA system 2 is provided in the aforementioned tachometer 12.

The lane deviation preventing function achieved by the aforementioned construction is now described referring to the flowchart of the lane deviation preventive control operation shown in FIG. 5. A program of the lane deviation preventive control operation is cyclically executed at intervals of 100 ms, for instance, for a specific period of time. First, image recognition operation is performed in step (hereinafter referred to simply as S) 101, in which the left-hand lane marking and the right-hand lane marking ahead are recognized based on the images in the running direction of the own vehicle 1 photographed by the CCD camera pair 3 as stated earlier.

Next, the operation flow proceeds to S102, in which a judgment is made on the possibility of deviation of the own vehicle 1 from the traffic lane and the judgment result is expressed by two kinds of flags (leftward deviation judgment flag FL and rightward deviation judgment flag FR) according to the later-described lane deviation judgment routine. Specifically, three kinds of results could be obtained from the operation of S102: there is no possibility of deviation from the traffic lane (FL←0, FR←0); there is a possibility of deviation to the left of the traffic lane (FL←1, FR←0); and there is a possibility of deviation to the right of the traffic lane (FL←0, FR←1)

Then, the operation flow proceeds to S103, in which a warning is generated if there exists the possibility of deviation from the traffic lane according to the lane deviation judgment. This warning is produced differently according to the vehicle speed, for example. When the vehicle speed V is between 40 km/h and 50 km/h, the warning is given by one warning lamp 7 only. If there is the possibility of deviation to the left side of the traffic lane, the leftward lane deviation warning light 7L is lit, and if there is the possibility of deviation to the right side of the traffic lane, the rightward lane deviation warning light 7R is lit. Also, when the vehicle speed V is equal to 50 km/h or above, generation of the warning is controlled such that it is given by both the warning lamp 7 (the leftward lane deviation warning light 7L or rightward lane deviation warning light 7R is lit as stated above) and the warning buzzer 8.

In the lane deviation judgment routine of S102 mentioned above, Y-coordinate YKL of a point of intersection PKL of the left-hand lane marking and the first judgment line LK is read in S201 and the vehicle speed V is read in S202 as shown in FIG. 6.

Subsequently, the operation flow proceeds to S203, in which the left side judgment value DHL is set according to the vehicle speed V. The operation flow further proceeds to S204, in which the Y-coordinate YKL of the point of intersection PKL and the left side judgment value DHL are compared with each other, wherein the right side of the center of the vehicle is expressed by positive Y-coordinate figures and the left side of the vehicle is expressed by negative Y-coordinate figures as shown in FIG. 3.

If YKL>DHL as a result of the comparison in S204, it is judged that the left-hand lane marking lies inside the vehicle and there exists the possibility of deviation to the left of the traffic lane according to the judgment on the first judgment line LK. Then, the operation flow proceeds to S205 to make a judgment on the second judgment line LE.

If YKL≦DHL in S204 above, it is judged that the left-hand lane marking lies outside the vehicle and there is no possibility of deviation to the left of the traffic lane according to the judgment on the first judgment line LK, that is, a final judgment is made that there is no possibility of deviation to the left of the traffic lane. Then, the operation flow jumps to S209 to make a judgment on the possibility of deviation to the right of the traffic lane.

When the operation flow proceeds to S205 based on the judgment that YKL>DHL in S204 above, Y-coordinate YEL of a point of intersection PEL of the left-hand lane marking and the second judgment line LE is read and the operation flow proceeds to S206, in which the Y-coordinate YEL of the point of intersection PEL and the left side judgment value DHL are compared with each other.

If YEL>DHL as a result of the comparison in S206, it is judged that the left-hand lane marking lies inside the vehicle and there exists the possibility of deviation to the left of the traffic lane according to the judgment on the second judgment line LE. Then, the operation flow proceeds to S207.

In S207, the rightward deviation judgment flag FR is cleared (FR←0) and the operation flow proceeds to S208, in which the leftward deviation judgment flag FL is set (FL←1) and the operation flow exits the routine. The operation flow proceeds to S207 above in a case where there exists the possibility of deviation to the left of the traffic lane according both to the judgment in S204 above (judgment on the first judgment line LK) and to the judgment in S206 above (judgment on the second judgment line LE). Consequently, a final judgment is made that there exists the possibility of deviation to the left of the traffic lane (FL←1, FR←0).

If YEL≦DHL as a result of the comparison in S206 above, it is judged that the left-hand lane marking lies outside the vehicle and there is no possibility of deviation to the left of the traffic lane according to the judgment on the second judgment line LE, that is, a final judgment is made that although there exists the possibility of deviation to the left of the traffic lane on the first judgment line LK, there is no possibility of deviation to the left of the traffic lane on the second judgment line LE, so that there is finally no possibility of deviation to the left of the traffic lane. Then, the operation flow proceeds to S209 to make a judgment on the possibility of deviation to the right of the traffic lane.

When the operation flow proceeds from S204 or S206 above to S209, the leftward deviation judgment flag FL is cleared at first (FL←0) because this is a case where there is no possibility of deviation to the left of the traffic lane in either S204 or S206.

Subsequently, the operation flow proceeds to S210, in which Y-coordinate YKR of a point of intersection PKR of the right-hand lane marking and the first judgment line LK is read. The operation flow then proceeds to S211, in which the right side judgment value DHR is set according to the vehicle speed V. The operation flow further proceeds to S212, in which the Y-coordinate YKR of the point of intersection PKR and the right side judgment value DHR are compared with each other.

If YKR<DHR as a result of the comparison in S212, it is judged that the right-hand lane marking lies inside the vehicle and there exists the possibility of deviation to the right of the traffic lane according to the judgment on the first judgment line LK. Then, the operation flow proceeds to S213 to make a judgment on the second judgment line LE.

If YKR≧DHR in S212 above, it is judged that the right-hand lane marking lies outside the vehicle and there is no possibility of deviation to the right of the traffic lane according to the judgment on the first judgment line LK, that is, a final judgment is made that there is no possibility of deviation to the right of the traffic lane and the operation flow jumps to S215.

When the operation flow proceeds to S213 based on the judgment that YKR<DHR in S212 above, Y-coordinate YER of a point of intersection PER of the right-hand lane marker line and the second judgment line LE is read and the operation flow proceeds to S214, in which the Y-coordinate YER of the point of intersection PER and the right side judgment value DHR are compared with each other.

If YER<DHR as a result of the comparison in S214, it is judged that the right-hand lane marking lies inside the vehicle and there exists the possibility of deviation to the right of the traffic lane according to the judgment on the second judgment line LE. Then, the operation flow proceeds to S216.

In S216, the rightward deviation judgment flag FR is set (FR←1) and the operation flow exits the routine. The operation flow proceeds to S216 above in a case where there exists the possibility of deviation to the right of the traffic lane according both to the judgment in S212 above (judgment on the first judgment line LK) and to the judgment in S214 above (judgment on the second judgment line LE). Consequently, a final judgment is made that there exists the possibility of deviation to the right of the traffic lane (FL←0, FR←1).

If YER≧DHR as a result of the comparison in S214 above, it is judged that the right-hand lane marking lies outside the vehicle and there is no possibility of deviation to the right of the traffic lane according to the judgment on the second judgment line LE, that is, a final judgment is made that although there exists the possibility of deviation to the right of the traffic lane on the first judgment line LK, there is no possibility of deviation to the right of the traffic lane on the second judgment line LE, so that there is finally no possibility of deviation to the right of the traffic lane. Then, the operation flow proceeds to S215.

When the operation flow proceeds from S212 or S214 above to S215, the rightward deviation judgment flag FR is cleared at first (FR←0) because this is a case where there is no possibility of deviation to the right of the traffic lane in either S212 or S214. The operation flow then exits the routine. S215 resets both the leftward deviation judgment flag FL and the rightward deviation judgment flag FR to 0, producing a judgment result that the vehicle has no possibility of deviation from the traffic lane.

According to the present embodiment seen above, it is finally judged that there exists the possibility of deviation from the traffic lane when the judgment results on both the first judgment line LK and the second judgment line LE indicate that there is the possibility of deviation from the traffic lane. Thus, if there is a complicated curve ahead and there exists no possibility of deviation from the traffic lane at a near curve segment (at a first distance), it is not finally judged that there is the possibility of deviation from the traffic lane, even when it is judged that there is the possibility of deviation from the traffic lane at a far curve segment (at a second distance) if the vehicle continues to run in its current running state. It is therefore possible to accurately judge the possibility of deviation from the traffic lane.

Also, since the judgment values used when judging the possibility of deviation from the traffic lane are set according to the vehicle speed, the judgment is made taking into consideration potential changes in the seriousness of deviation from the traffic lane with the vehicle speed, for instance. Accordingly, the system provides higher accuracy and greater practicability.

Although the possibility of deviation from the traffic lane is judged based on the location of the lane markings detected from a pair of camera images and the location of the own vehicle in the present embodiment, the possibility of deviation from the traffic lane may be judged by using other methods, such as a radar.

As thus far described, a first judgment line is set approximately parallel to a lateral direction of own vehicle at a first distance ahead of the own vehicle, a second judgment line is set approximately parallel to the lateral direction of the own vehicle at a second distance ahead of the own vehicle, a judgment on the possibility of deviation from a traffic lane is made based on the location of the own vehicle and the location of lane markings on the first judgment line, another judgment on the possibility of deviation from the traffic lane is made based on the location of the own vehicle and the location of the lane markings on the second judgment line, and the possibility of deviation from the traffic lane is finally judged based on results of these two judgments according to the present embodiment. Accordingly, if there is a complicated curve ahead, its presence is taking into consideration in making the judgments, and this provides such an advantageous effect that the possibility of deviation from the traffic lane can be accurately judged.

While the presently preferred embodiments of the present invention have been shown and described, it is to be understood that the disclosure is for the purpose of illustration and that various changes and modifications maybe made without departing from the scope of the invention as set forth in the appended claims.

What is claimed is:

1. A vehicular active drive assist system comprising a lane deviation judgment unit which judges the possibility of deviation of own vehicle from a traffic lane on a roadway ahead and a warning control unit which controls a warning based on judgment results fed from the lane deviation judgment unit, wherein the lane deviation judgment unit sets a first judgment line approximately parallel to a lateral direction of the own vehicle at a first distance ahead of the own vehicle, sets a second judgment line approximately parallel to the lateral direction of the own vehicle at a second distance ahead of the own vehicle, makes a judgment on the possibility of deviation from the traffic lane based on the location of the own vehicle and the location of lane markings on the first judgment line, makes another judgment on the possibility of deviation from the traffic lane based on the location of the own vehicle and the location of the lane markings on the second judgment line, and finally judges the possibility of deviation from the traffic lane based on the results of these two judgments.

2. The vehicular active drive assist system as recited in claim 1, further comprising a vehicle speed sensing unit for detecting vehicle speed, wherein the lane deviation judgment unit variably sets positions of the own vehicle on the first judgment line and the second judgment line to be used in judging the possibility of deviation from the traffic lane according to the vehicle speed.

3. The vehicular active drive assist system as recited in claim 1, wherein the lane deviation judgment unit sets a left side judgment value and a right side judgment value differing from each other in size as positions of the own vehicle.

4. The vehicular active drive assist system as recited in claim 2, wherein the lane deviation judgment unit sets a left side judgment value and a right side judgment value differing from each other in size as positions of the own vehicle.

* * * * *